US012700250B2

(12) United States Patent
Tatewaki

(10) Patent No.: US 12,700,250 B2
(45) Date of Patent: Aug. 4, 2026

(54) PARTICLE IMAGE ANALYSIS APPARATUS, PARTICLE IMAGE ANALYSIS SYSTEM, PARTICLE IMAGE ANALYSIS METHOD, AND PROGRAM FOR PARTICLE IMAGE ANALYSIS APPARATUS

(71) Applicant: HORIBA, LTD., Kyoto (JP)

(72) Inventor: Yasuhiro Tatewaki, Kyoto (JP)

(73) Assignee: HORIBA, LTD., Kyoto (JP)

( * ) Notice: Subject to any disclaimer, the term of this patent is extended or adjusted under 35 U.S.C. 154(b) by 250 days.

(21) Appl. No.: 18/572,629

(22) PCT Filed: Mar. 25, 2022

(86) PCT No.: PCT/JP2022/014559
§ 371 (c)(1),
(2) Date: Dec. 20, 2023

(87) PCT Pub. No.: WO2023/276361
PCT Pub. Date: Jan. 5, 2023

(65) Prior Publication Data
US 2024/0290116 A1 Aug. 29, 2024

(30) Foreign Application Priority Data
Jun. 30, 2021 (JP) ................................ 2021-108586

(51) Int. Cl.
*G06V 20/69* (2022.01)
*G01N 15/0205* (2024.01)
*G06V 10/98* (2022.01)

(52) U.S. Cl.
CPC ....... *G06V 20/698* (2022.01); *G01N 15/0211* (2013.01); *G06V 10/993* (2022.01); *G06V 20/695* (2022.01)

(58) Field of Classification Search
CPC .. G06V 20/698; G06V 20/695; G06V 10/993; G01N 15/0211
See application file for complete search history.

(56) References Cited

U.S. PATENT DOCUMENTS 6,522,781 B1 * 2/2003 Norikane .............. G06T 7/0004
356/73
2020/0134287 A1 * 4/2020 Fujimoto ............... G06V 20/69

FOREIGN PATENT DOCUMENTS

JP 2011075341 A * 4/2011
JP 2011-203209 A 10/2011
(Continued)

OTHER PUBLICATIONS

International Search Report for the corresponding patent application No. PCT/JP2022/014559 dated May 31, 2022, with English translation.

(Continued)

*Primary Examiner* — Wednel Cadeau
(74) *Attorney, Agent, or Firm* — LUCAS & MERCANTI, LLP

(57) ABSTRACT

A particle analysis apparatus includes: an individual particle image generation unit that extracts individual particles from the original image and generates individual particle images; a particle characteristic calculation unit that calculates one or a plurality of types of particle characteristics for a particle in each of the individual particle images, based on the each of the individual particle images; a classification unit that classifies, with respect to a plurality of classes defined by some or all of the one or plurality of types of particle characteristics, the particles into the classes that correspond to the calculated one or plurality of particle characteristics; and an individual particle image storing unit that stores in a (Continued)

storage the individual particle images of particles belonging to each of the plurality of classes.

15 Claims, 5 Drawing Sheets

(56) References Cited

FOREIGN PATENT DOCUMENTS

| | | |
|---|---|---|
| JP | 2020-071037 A | 5/2020 |
| JP | 2020-094852 A | 6/2020 |

OTHER PUBLICATIONS

Extended European Search Report, dated Apr. 29, 2025, which was issued for the corresponding European Patent Application No. 22832522.1, 9 pages.

* cited by examiner

PARTICLE IMAGE ANALYSIS APPARATUS, PARTICLE IMAGE ANALYSIS SYSTEM, PARTICLE IMAGE ANALYSIS METHOD, AND PROGRAM FOR PARTICLE IMAGE ANALYSIS APPARATUS

CROSS REFERENCE TO RELATED APPLICATION

This Application is a 371 of PCT/JP2022/014559 filed on Mar. 25, 2022, which, in turn, claims priority of Japanese Patent Application No. 2021-108586 filed on Jun. 30, 2021, and the above applications are incorporated herein by reference.

TECHNICAL FIELD

The present invention relates to a particle image analysis apparatus that analyzes a particle characteristic such as a particle size on the basis of an image in which particles or a particle group is imaged.

BACKGROUND ART

There are various methods for analyzing particle characteristics such as particle sizes of various powders. The following method can be exemplified as such methods. Individual particle images are generated by extracting individual particles from an original image in which a particle group is imaged, and the individual particle images are subjected to image analysis, thereby calculating particle sizes and other shape parameters (see Patent Literature 1).

In such image analysis of particles, some of the individual particle images generated to calculate the particle characteristics are stored as image data in a storage such as a hard disk so that the user can browse the images after the analysis. This is because the number of the individual particle images generated to calculate the particle characteristic in one particle image analysis is 1,000 or 10,000, and the data capacity is immediately saturated if all the individual particle images are stored in the storage.

Therefore, the individual particle images up to, for example, a predetermined number from the firstly generated individual particle image are stored in the storage, and the individual particle images generated thereafter are deleted after the particle characteristics are calculated.

However, such an individual particle image storage method has the following problem. Only the particles that have similar sizes and shapes and have a high appearance frequency are stored in large number, and only little information can be obtained about the particle group for a large data volume.

CITATION LIST

Patent Literature

Patent Literature 1: JP 2020-94852 A

SUMMARY OF INVENTION

Technical Problem

The present invention has been made in view of the above problem, and an object of the present invention is to provide a particle image analysis apparatus in which it is possible to obtain information on the basis of individual particle images not only for a particle having a high appearance frequency but also for a particle having a low appearance frequency while suppressing a data capacity required to store individual particle images.

Solution to Problem

A particle image analysis apparatus according to the present invention is a particle analysis apparatus that analyzes a particle characteristic, based on an original image in which particles or a particle group is imaged, and the particle image analysis apparatus includes: an individual particle image generation unit that extracts individual particles from the original image and generates individual particle images: a particle characteristic calculation unit that calculates one or a plurality of types of particle characteristics for a particle in each of the individual particle images, based on the each of the individual particle images: a classification unit that classifies, with respect to a plurality of classes defined by some or all of the one or plurality of types of particle characteristics, the particles into the classes that correspond to the calculated one or plurality of particle characteristics; and an individual particle image storing unit that stores in a storage the individual particle images of particles belonging to each of the plurality of classes, the individual particle images stored in the storage being less than or equal to a storage upper limit number set for the each of the plurality of classes. Here, the storage is a concept including, for example: an internal storage built in a terminal body such as a computer; an external storage externally attached to a terminal body such as a computer; an online storage provided on a cloud and connected to a terminal body such as a computer via a network line; and the like.

A particle image analysis method according to the present invention is a particle analysis method that analyzes a particle characteristic, based on an original image in which particles or a particle group is imaged, and the particle image analysis method includes: generating individual particle images by extracting individual particles from the original image: calculating one or a plurality of types of particle characteristics for a particle in each of the individual particle images, based on the each of the individual particle images; classifying, with respect to a plurality of classes defined by some or all of the one or plurality of types of particle characteristics, the particles into the classes that correspond to the calculated one or plurality of particle characteristics; and storing in a storage the individual particle images of particles belonging to each of the plurality of classes, the individual particle images stored in the storage being less than or equal to a storage upper limit number set for the each of the plurality of classes.

In such configurations, the storage upper limit number is set for each of the classes, and it is therefore possible to: store the individual particle images in the storage while suppressing the number of the stored individual particle images within the storage upper limit number with respect to the particles belonging to the class having a high appearance frequency; and store the individual particle images in the storage with respect to the particles belonging to a class having a low appearance frequency. Therefore, the individual particle images of the particles having a low appearance frequency are also stored while suppressing the data capacity required for the storage in which the individual particle images are stored, and the information that the user can obtain about the particle group can be greatly increased.

In order to store individual particle images, of the individual particle images to be stored, having quality as high as possible and in order to be able to obtain more information about the particle group, the particle image analysis apparatus may further include an image characteristic evaluation unit that evaluates an image characteristic of each of the individual particle images. The individual particle image storing unit selects the individual particle images based on an evaluation result of the image characteristic evaluation unit and stores, in the storage, the storage upper limit number or less of individual particle images for each of the classes.

In order to store, in the storage, focused individual particle images of the individual particle images within the storage upper limit number and to erase a defocused individual particle image that is out of focus, the particle image analysis apparatus may be configured as follows: the image characteristic evaluation unit evaluates a focus state of a particle in each of the individual particle images, and the individual particle image storing unit preferentially stores an individual particle image, of the individual particle images, having a good focus state for each of the classes.

In order for the user to easily check the shape or the like of a particle having a specific particle characteristic while grasping the distribution of the particle characteristic in the particle group and to easily obtain the information on the particle, the particle image analysis apparatus may further include: an analysis result display unit that displays an analysis result representing a distribution of a particle characteristic of each of the particles: a region setting unit that sets a plurality of regions on the analysis result in accordance with the classes: a reception unit that receives, from a user, selection with respect to the regions on the analysis result; and an individual particle image display unit that reads out, from the storage unit, an individual particle image of particles belonging to a class corresponding to the region selected by the user and displays the read-out individual particle image.

In order to make it easy to check the distribution with respect to the plurality of particle characteristics and information such as a difference in shape between particles having different combinations of particle characteristics, there can be exemplified the particle image analysis apparatus in which the analysis result is a scatter diagram having two or more types of particle characteristics as variables, each of the classes is defined by all particle characteristics used for the scatter diagram, and the plurality of regions are set in a matrix on the scatter diagram.

In order to make it easy to check the shape of a representative particle in each of the class while grasping a distribution of the particles with respect to a single type of particle characteristic, the particle image analysis apparatus may be configured as follows: the analysis result is a histogram having a single type of particle characteristic as a variable, and the plurality of regions are set for a range of each of the classes on the histogram.

In order to make it easier for the user to grasp the correspondence relationship between the particle characteristics and the particle shape or the like, the particle image analysis apparatus may be configured as follows: the analysis result and the individual particle images are displayed on a single screen.

In order to display a list of the individual particle images that is stored within the storage upper limit number and thereby to make it easy to grasp overall characteristic of a particle belonging to a certain class, and at the same time, to make it easy to study in more detail a specific individual particle image, the particle image analysis apparatus may be configured as follows, the individual particle image display unit displays, in a juxtaposed manner, a list of a plurality of individual particle images related to the particles belonging to the class corresponding to the region selected by the user, the reception unit receives selection with respect to the individual particle images from the user, and the individual particle image display unit displays an enlarged image of an individual particle image selected by the user.

In order to appropriately increase or decrease the number of individual particle images so that it is possible to adjust a trade-off between a data capacity to be used and an amount of information obtained about the particle group, the particle image analysis apparatus may be configured as follows: the storage upper limit number is settable uniformly or individually for each of the classes.

In order to make it possible to store all of the individual particle images of the particles, for example, having a unique particle characteristic so that it is easier to obtain important particle information and information about an abnormality in a particle producing process and the like, the particle image analysis apparatus may be configured as follows: the setting of the storage upper limit number is removed for some of the classes, and all of the individual particle images of the some of the classes are stored.

In order to cause the storage upper limit number or less of individual particle images required by the user to be more easily stored within the storage upper limit number, the particle image analysis apparatus may be configured as follows: an image characteristic to be evaluated by the image characteristic evaluation unit is settable. For example, a parameter about images such as sharpness or contrast other than the focus state may be used as an evaluation value as the image characteristic so that individual particle images satisfying a predetermined standard will be stored within the storage upper limit number. Furthermore, the image characteristic to be evaluated is not limited to a single type, and an output of an evaluation function having a plurality of types of image characteristics as variables may be used as the evaluation value.

In order to overview the features of the particles belonging to each of the classes and to make it easier to consider the tendency or the like of the entire particles, the particle image analysis apparatus may further include a list display unit that reads out from the storage the individual particle images of the particles belonging to each class of the plurality of classes, and displays on a single screen a list of individual particle images that are read out in association with each of the classes. That is, the particle image analysis apparatus according to the present invention can store the individual particle images over the entire classes: therefore, the individual particle images representing each of the classes as described above can be displayed in a list. In contrast, conventionally, the individual particle images are stored only for a class having a high appearance frequency: therefore, it is impossible in the first place to display a list of the individual particle images over the entire classes.

Specific examples of the particle characteristic to be analyzed by the particle image analysis apparatus include at least one of a particle size, an aspect ratio, a degree of circularity, a major axis diameter, a minor axis diameter, an envelope peripheral length, an actual peripheral length, or a degree of envelope.

As an analysis system that achieves a series of steps from generating an original image in which particles or a particle group is imaged to grasping a distribution of particle characteristics and storing individual particle images of particles belonging to each of the classes, there is exemplified a particle image analysis system that includes: the particle image analysis apparatus according the present invention; a light source that irradiates particles or a particle group contained in a cell with light; and an imaging unit that images an inside of the cell and outputs the original image.

In order to make it possible to enjoy an effect equivalent to that of the particle image analysis apparatus according to the present invention by updating a program in an existing particle image analysis apparatus, the following program may be used. A program for particle image analysis apparatus that is used for a particle analysis apparatus to analyze a particle characteristic, based on an original image in which particles or a particle group is imaged, and the program causes a computer to execute the following functions: a function of an individual particle image generation unit that extracts individual particles from the original image and generates individual particle images: a function of a particle characteristic calculation unit that calculates one or a plurality of types of particle characteristics for a particle in each of the individual particle images, based on the each of the individual particle images: a function of a classification unit that classifies, with respect to a plurality of classes defined by some or all of the one or plurality of types of particle characteristics, the particles into the classes that correspond to the calculated one or plurality of particle characteristics; and a function of an individual particle image storing unit that stores in a storage the individual particle images of particles belonging to each of the plurality of classes, the individual particle images stored in the storage being less than or equal to a storage upper limit number set for the each of the plurality of classes.

Note that the program for particle image analysis apparatus may be distributed electronically or may be recorded in a program recording medium such as a compact disc (CD), a digital versatile disc (DVD), a hard disc drive (HDD), or a flash memory.

Advantageous Effects of Invention

As described above, since the particle image analysis apparatus of the present invention is configured to store, in the storage, the individual particle images of the particles belonging to each of the classes within the storage upper limit number, it is possible to store the individual particle images of the particles having a low appearance frequency while suppressing the number of the stored images for the individual particle images having a high appearance frequency and similar characteristics. Therefore, it is possible to store the individual particle images of the particles having a low appearance frequency while suppressing the data capacity required to store individual particle images and to obtain more information on the particle group.

DESCRIPTION OF EMBODIMENTS

A particle image analysis apparatus 100 according to an embodiment of the present invention and a particle image analysis system 200 including the particle image analysis apparatus 100 will be described with reference to the drawings.

The particle image analysis system 200 of the present embodiment includes: a particle size distribution measurement device 101 that measures a particle size distribution of a particle group on the basis of the static light scattering method; and a particle image analysis apparatus 100 that analyzes various characteristics of the particles on the basis of an image in which particles or a particle group is imaged.

Figure 1:
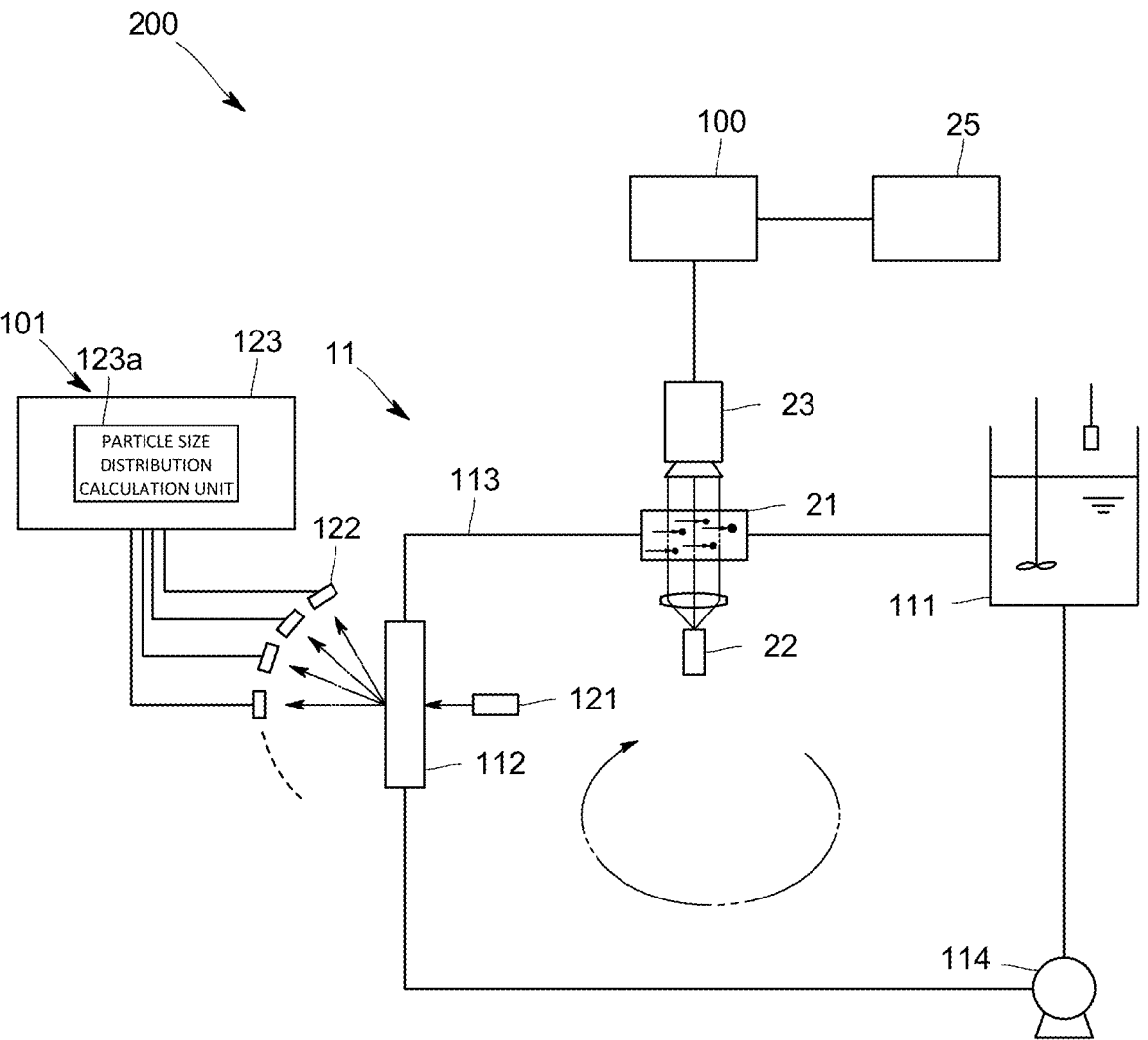
FIG. 1 is a schematic diagram illustrating an embodiment of a particle image analysis apparatus and a particle image analysis system according to the present invention.

Specifically, as illustrated in FIG. 1, the particle image analysis system 200 includes a circulation system 11 in which a sample feed tank 111, a laser diffraction cell 112, and an image acquisition cell 21 are connected via a circulation flow path 113 such that a suspension in which a powder sample is dispersed in a dispersion medium is circulated. The particle size distribution measurement device 101 measures a particle size distribution of a particle group on the basis of scattered light generated by irradiating the suspension flowing in the laser diffraction cell 112 with laser light. On the other hand, the particle image analysis apparatus 100 images a particle group in the suspension flowing through the image acquisition cell 21, and analyzes, for example, a distribution of a characteristic related to the shape of the particles.

The sample feed tank 111 mixes a fed powder sample containing a plurality of particles and a dispersion medium (for example, pure water or alcohol) for dispersing the powder sample, thereby producing a suspension. By mixing the powder sample and the dispersion medium, the particles contained in the powder sample are dispersed in the dispersion medium to form a particle group.

The circulation system 11 is provided with a centrifugal circulation pump 114 to forcibly circulate the suspension, so that the suspension mixed in the sample feed tank 111 can be sent out to the laser diffraction cell 112.

The laser diffraction cell 112 is of a so-called flow type and is configured such that a suspension introduced from the outside can be caused to flow liquid-tightly between a pair of opposed light transmission plates and to be led to the outside. Laser light is applied from one light transmission plate side toward the other light transmission plate side.

The particle size distribution measurement device 101 includes: a laser light source 121 that irradiates the suspension in the laser diffraction cell 112 with laser light; a plurality of photodetectors 122 that detect, in accordance with a scattering angle, the intensity of scattered light generated by irradiation with the laser light; and an information processing device 123 that calculates a particle size distribution of the particle group on the basis of light intensity signals output from the plurality of photodetectors 122.

Physically speaking, the information processing device 123 is a general-purpose or dedicated computer including a central processing unit (CPU), a memory, an input/output interface, and the like, and at least exhibits a function as a particle size distribution calculation unit 123a by causing the CPU and peripheral devices to cooperate according to a predetermined program stored in a predetermined area of the memory.

The particle size distribution calculation unit 123*a* calculates the particle size distribution of the particle group in the suspension on the basis of the light intensity signals output from the plurality of photodetectors 122. Specifically, the particle size distribution corresponding to the scattering pattern is calculated on the basis of the scattering pattern, which is represented by the light intensity signals output from the plurality of photodetectors 122 and includes the scattering angles and the intensities of the scattered light at the scattering angles, and a predetermined theoretical arithmetic expression derived from Mie scattering theory, Rayleigh scattering theory, Fraunhofer diffraction theory, or the like.

Furthermore, the particle image analysis system 200 of the present embodiment captures an image of particles or a particle group contained in the image acquisition cell 21, extracts individual particles from the captured image to generate individual particle images PI, and measures a distribution of particle characteristic such as a particle size by image analysis of each individual particle image PI. That is, the particle image analysis system 200 measures, as particle characteristics, various parameters regarding the particle size of each particle and the shape of each particle, for example, by automatic static image analysis.

That is, with respect to the image acquisition cell 21, the following are provided: an image acquisition light source 22 that irradiates a suspension in the image acquisition cell 21 with light; and an imaging device 23 that images the suspension in the image acquisition cell 21. Furthermore, the particle image analysis apparatus 100 processes a captured image taken by the imaging device 23 and thereby analyzes the characteristics related to the shapes of the particles. Then, the analysis result of the particle image analysis apparatus 100 is displayed on a display 25 that displays.

The image acquisition cell 21 is of a so-called flow type and is configured such that a suspension introduced from the outside is made to flow between a pair of opposed light transmission plates and can be led to the outside. Light is applied from one light transmission plate toward the other light transmission plate.

The image acquisition light source 22 irradiates the suspension in the image acquisition cell 21 with parallel light and includes, for example, an (light-emitting diode) LED device such as a white LED and a light condensing mechanism such as a lens that condenses light emitted from the LED device into parallel light.

The imaging device 23 continuously images a particle group in the suspension flowing in the image acquisition cell 21 and sequentially outputs captured image data representing the captured image (see FIG. 2) to a second information processing device 24. Specifically, the imaging device 23 includes an imaging element such as a color or monochrome charge-coupled device (CCD) or complementary metal-oxide semiconductor (CMOS) image sensor.

The particle image analysis apparatus 100 is a so-called computer including a CPU, a memory, a hard disk as a storage S, an analog-to-digital (A/D) converter, a digital-to-analog (D/A) converter, a display 25, various input/output devices, and the like. When the CPU executes a program for particle image analysis apparatus stored in the HDD and the devices cooperate with each other, the particle image analysis apparatus 100 exerts functions as at least: an original image storage unit 51, an individual particle image generation unit 52, a temporary storage unit 53, a particle characteristic calculation unit 54, a classification unit 56, an image characteristic evaluation unit 55, an individual particle image storing unit 57, an analysis result display unit 58, an individual particle image display unit 59, and a reception unit 60.

Each unit will be described below.

The original image storage unit 51 stores, in an original image storage area S1 in the storage S, an original image that is captured by the imaging device 23 and in which a particle group including a large number of particles is imaged. In the present embodiment, the original image storage area S1 is set in a hard disk that is a built-in storage. Note that the original image storage unit 51 is not limited to a unit configured to store the original image in the built-in storage, and may be configured to store the original image in an external storage or an online storage. Furthermore, the storage S is not limited to a hard disk, and may be a recording medium such as a solid state drive (SSD).

The individual particle image generation unit 52 extracts individual particles present in the original image and generates individual particle images PI that individually include a single particle of the individual particles and have a smaller size than the original image. As an algorithm for extracting individual particles from the original image, an existing algorithm can be used. For example, the individual particles are extracted by detecting a contour line of each particle on the basis of the contrast difference in the original image. Each of the individual particle image PI is generated as an image within predetermined pixels such that the image entirely encloses the individual particle with the individual particle positioned at the center. Furthermore, each of the generated individual particle images PI are temporarily stored in the temporary storage unit 53. Specifically, in the present embodiment, the temporary storage unit 53 stores the individual particle images PI generated by the individual particle image generation unit 52, for example, in a temporary storage area S2 set in the storage S. Note that the temporary storage unit 53 is not limited to a unit that temporarily stores the individual particle images PI in the storage S as an auxiliary storage device, and may be a unit that temporarily stores each individual particle image PI in the temporary storage area S2 set in a storage device such as a memory as a main storage device.

The particle characteristic calculation unit 54 performs image analysis on the individual particle images PI temporarily stored in the storage device by the temporary storage unit 53, and calculates one or a plurality of types of particle characteristics. The particle characteristics calculated in the present embodiment are a particle size, an aspect ratio, a degree of circularity, a major axis diameter, and a minor axis diameter. In addition, the particle characteristic calculation unit 54 may also calculate, by image analysis, an envelope peripheral length, an actual peripheral length, a degree of envelope, a particle color, and the like. Note that an existing image analysis algorithm can be also used as the algorithm for calculating the particle characteristics.

Furthermore, not only the individual particle images PI temporarily stored in the storage device in the temporary storage unit 53 are used to calculate the particle characteristics, but also the individual particle image storing unit 57 stores, in the storage S, some of the individual particle images PI that satisfy a predetermined condition. Furthermore, the individual particle images not satisfying the condition are not stored in the storage S by the individual particle image storing unit 57 and are deleted. In the present embodiment, a plurality of classes are defined by ranges of values in a plurality of types of particle characteristics, and a storage upper limit number of individual particle images PI is set for each class. Note that the individual particle image storing unit 57 stores the individual particle images satisfying a predetermined condition, in an individual particle image storage area S3 set, for example, in a hard disk that is the internal storage S. Here, the individual particle image storing unit 57 is not limited to a unit configured to store the individual particle images PI in a built-in storage, and may be a unit configured to store the individual particle images PI in an external storage or an online storage. Furthermore, the storage S is not limited to a hard disk, and may be a recording medium such as a solid state drive (SSD).

Next, details of each unit related to storing of the individual particle images PI will be described.

With respect to a plurality of classes defined by some or all of the one or a plurality of types of particle characteristics calculated by the particle characteristic calculation unit 54, the classification unit 56 classifies particles into the classes that the calculated particle characteristics correspond to. In the present embodiment, the plurality of classes are defined based on ranges of at least two types of values of the particle size and the aspect ratio of the particle characteristics. More specifically, with respect to the particle size, every class width is set to a first interval, and with respect to the aspect ratio, every class width is set to a second interval different from the first interval. Therefore, the classes are configured to be a matrix including a combination of each class of particle size and each class of aspect ratio. As a result, in the present embodiment, the classification unit 56 determines which element of the classes in a matrix shape defined by the particle size and the aspect ratio the calculated particle characteristics is matched, and associates a class identifier indicating the matched class with the individual particle images PI.

Furthermore, the image characteristic evaluation unit 55 evaluates the image characteristics of the individual particle images PI temporarily stored in the temporary storage area S2 of the internal storage, which is a storage device, by the temporary storage unit 53, and associates the evaluation values with the corresponding individual particle images PI. In the present embodiment, the focus states of the particles in the individual particle images PI are evaluated as the image characteristic. For the evaluation of the focus state, an existing image processing algorithm can be used. For example, there are various methods such as: a method of evaluating how many high-frequency components of the power spectrum exist by using fast Fourier transformation; and a method of evaluating the focus state by using an evaluation value using Laplacian differentiation. By using a method as described above, the image characteristic evaluation unit 55 associates the used evaluation values with the corresponding individual particle images PI.

Next, on the basis of the class, of the particle imaged in the individual particle image PI, input from the classification unit 56, and the evaluation value, of the image evaluation of the individual particle image PI, input from the image evaluation unit, the individual particle image storing unit 57 determines whether to store, in the storage S, or erase the individual particle image PI for which the calculation of the particle characteristics has already been completed. That is, the individual particle image PI is stored as it is when the number of the individual particle images PI stored in the storage S is less than the previously set storage upper limit number with respect to the class of the particle imaged in the individual particle image PI. On the other hand, when the number of the individual particle images PI stored in the storage S for the class of the particle imaged in a certain individual particle image PI is equal to or larger than the storage upper limit number, a comparison is made between the evaluation values regarding the focus states of the plurality of individual particle images PI already stored in the class and the evaluation value regarding the focus state of the new individual particle image PI. In a case where the comparison shows, for a certain class, that the new individual particle image PI has a better focus state than the individual particle image PI that is already stored in the storage S and has the worst focus state, the individual particle image PI having the worst evaluation among the individual particle images PI already stored in the storage S is deleted, and the new individual particle image PI is newly stored in the storage S. Such comparison and determination is performed for each individual particle image PI in the class to which each particle belongs, and, finally, the individual particle images PI of the particles corresponding to each class are stored in the individual particle image storing unit 57, within the storage upper limit number for the class.

Next, a configuration related to a display screen for the analysis result will be described in detail.

Figure 3:
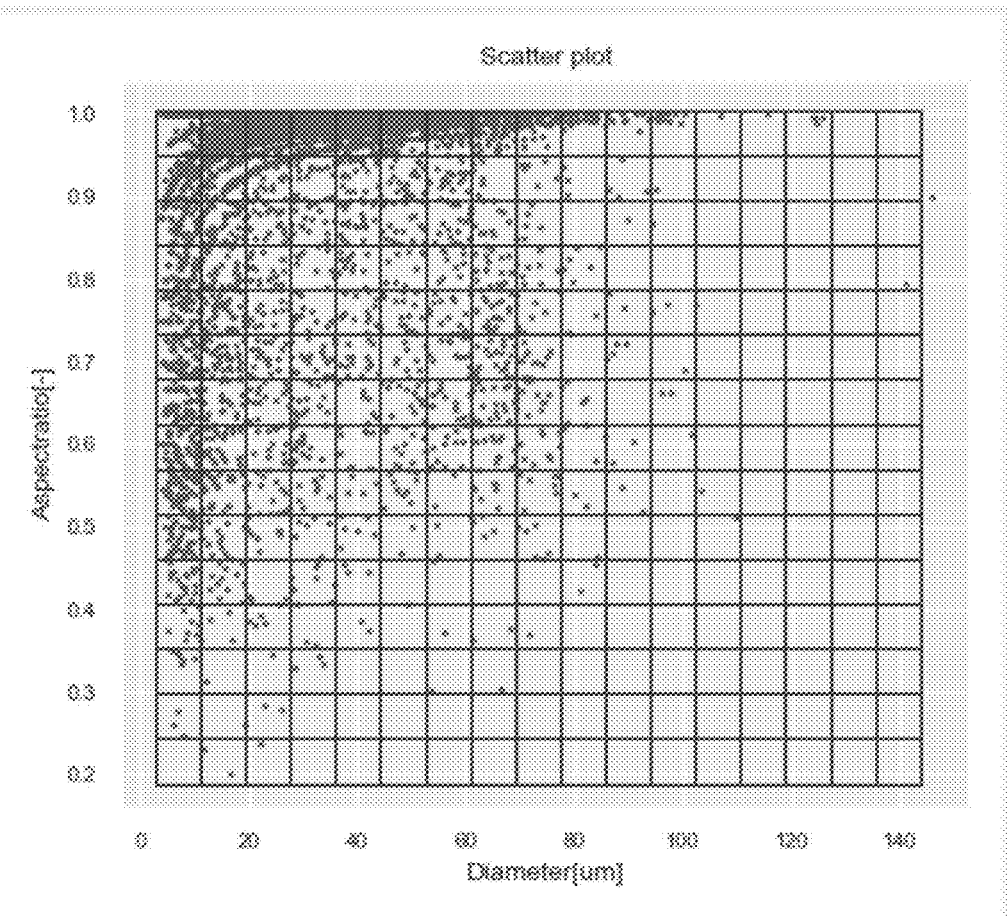
FIG. 3 is a display example of an analysis result in the embodiment and a setting example of regions corresponding to classes on the analysis result.

The analysis result display unit 58 displays the analysis result of the particle characteristics on the display 25 as a particle group, on the basis of the particle characteristics calculated by the particle characteristic calculation unit 54. In the present embodiment, as shown in FIG. 3, for example, the analysis result is displayed as a scatter diagram in which the particle size and the aspect ratio are used as two variables. Note that it may be appropriately set which one of the particle characteristics calculated in accordance with the information that the user wants to know is used as a variable. Furthermore, in the scatter diagram illustrated in FIG. 3, the regions corresponding to the defined classes are set to be selectable. That is, the squares described in a matrix shape in FIG. 3 each correspond to one of the classes.

Figure 4:
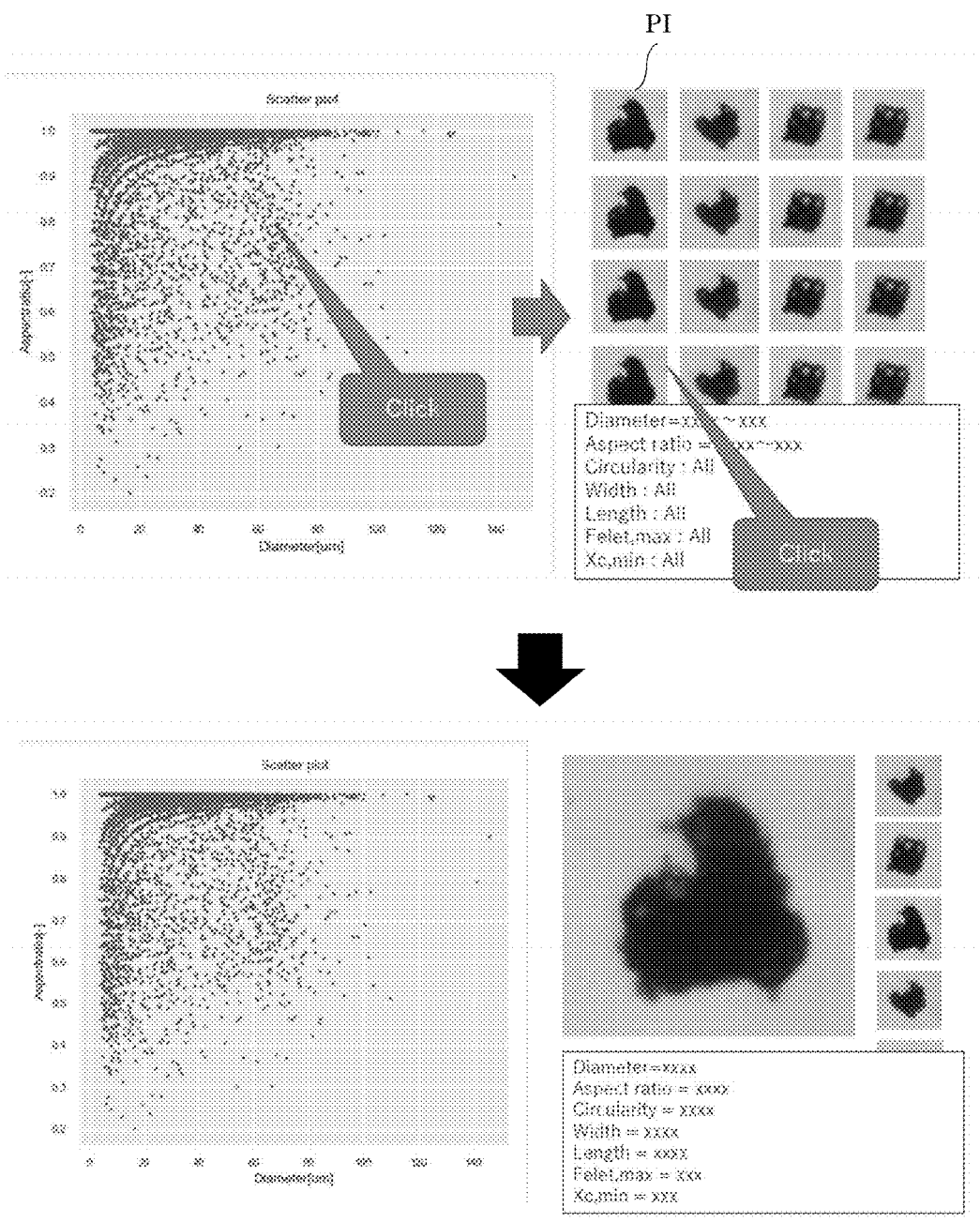
FIG. 4 is a screen transition example of an analysis result display screen in the embodiment.

Furthermore, when an input by a user to select any of the regions is received by the reception unit 60 via a mouse or the like, the individual particle image display unit 59 displays a plurality of individual particle images PI stored in the class corresponding to the region, on the same screen as illustrated in FIG. 4. In addition, the individual particle image display unit 59 also displays detailed information of the class to which the particles imaged in the displayed individual particle images PI belong. Furthermore, when an input to select any of the plurality of displayed individual particle images PI is received by the reception unit 60, the individual particle image display unit 59 enlarges and displays the selected individual particle image PI larger than the other individual particle images PI.

Note that a method for the user to select the region corresponding to the classes on the scatter diagram is not limited to position input by a mouse or the like. For example, the individual particle image display unit 59 may be configured such that a range or value of the particle characteristics defining the class is input as a numerical value via a keyboard or the like and such that the individual particle image corresponding to the class is displayed.

In the particle image analysis apparatus 100 and the particle image analysis system 200 of the present embodiment configured as described above, since the storage upper limit number of the individual particle images PI that can be stored in the storage S is determined for each of the plurality of classes that are set based on the plurality of types of particle characteristics, the individual particle images PI of the particles belonging to the class having a high appearance frequency can be limited by the storage upper limit number, and the individual particle images PI of the particles belonging to the class having a low appearance frequency can also be stored. Therefore, the individual particle images PI of the particles belonging to various classes can be stored in the storage S, and the data capacity of the storage S required for storage can be made not so large while increasing the amount of information obtained regarding the particle group.

In addition, the particle image analysis apparatus 100 and the particle image analysis system 200 of the present embodiment are configured such that, in a case where the individual particle images PI exceeding the storage upper limit number is obtained for the particles belonging to a certain class, image evaluation is performed, and with the individual particle image PI having a better focus state will replace, so that it is possible to store, in the storage S, the individual particle image PI whose shape and the like are easily recognized. Therefore, it is easier for a user to perform visual evaluation and the like of the particles.

In addition, the following are displayed on a single screen as illustrated in FIG. 4: the scatter diagram of the plurality of types of particle characteristics; the individual particle images PI of the particles belonging to the class corresponding to the region selected by the user on the scatter diagram; and the numerical ranges of the particle characteristics that define the class. Therefore, it is easy for the user to intuitively understand the correspondence relationship between the frequency at which the particles having certain characteristics are generated and the specific shapes of such particles.

Other embodiments will be described.

Figure 5:
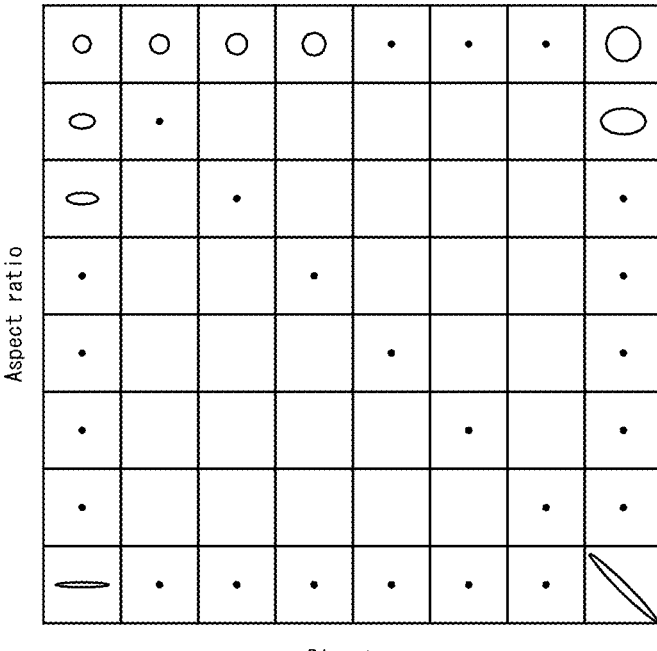
FIG. 5 is an example of a list display screen in another embodiment.

The particle image analysis apparatus may further include a list display unit that reads out the individual particle images of the particles belonging to each class of the plurality of classes from the storage, and displays on a single screen a list of the individual particle images that are read out in association with each class. A case where the class is defined by the particle size and the aspect ratio will be described as an example. As illustrated in FIG. 5, the list display unit reads out from the storage the individual particle images corresponding to the regions corresponding to the respective classes and displays the individual particle images in a list. Note that, if an individual particle image corresponding to a part that is abbreviated as a black dot in FIG. 5 is present in the storage, the individual particle image is displayed. For example, in a case where a plurality of individual particle images are stored for each class, the individual particle image with which the best evaluation is associated by the image characteristic evaluation unit is displayed as the representative of the class. The reason why such individual particle images representing their respective classes can be displayed in a juxtaposed manner is that the number of individual particle images of particles belonging to a class having a high appearance frequency is limited by the storage upper limit number by the individual particle image storing unit and that the individual particle images of particles belonging to a class having a low appearance frequency can also be stored in the storage. Conventionally, there is a high possibility that the individual particle image of a particle belonging to a class having a low appearance frequency is not stored in the first place; therefore, it is considered that it is difficult to display such a list as illustrated in FIG. 5.

In the above embodiment, the particle image analysis system calculates all the particle characteristics by the static image analysis. However, only some particle characteristics may be calculated by the image analysis based on the individual particle image, and other particle characteristics may be calculated by another principle. For example, the particle size may be calculated by dynamic image analysis based on Brownian motion of the particles, and the other particle characteristics regarding shapes may be calculated by the static image analysis. The particle characteristics output by the particle image analysis apparatus are not limited to the characteristics described in the above embodiment, and may be other characteristics, or may be at least one of a particle size, an aspect ratio, a degree of circularity, a major axis diameter, a minor axis diameter, an envelope peripheral length, an actual peripheral length, or a degree of envelope that are exemplified in the above embodiment.

The particle image analysis apparatus may be used alone. For example, data of an original image in which particles or a particle group is imaged may be prepared, and the data may be input to the particle image analysis apparatus to analyze various particle characteristics. Furthermore, a particle image analysis system may be configured by combining the particle image analysis apparatus according to the present invention with an existing particle analysis apparatus including a light source and an imaging device. Furthermore, the particle size distribution measurement device may be omitted from the particle image analysis system of the embodiment, and the particle size distribution may be calculated only from the captured image.

Figure 2:
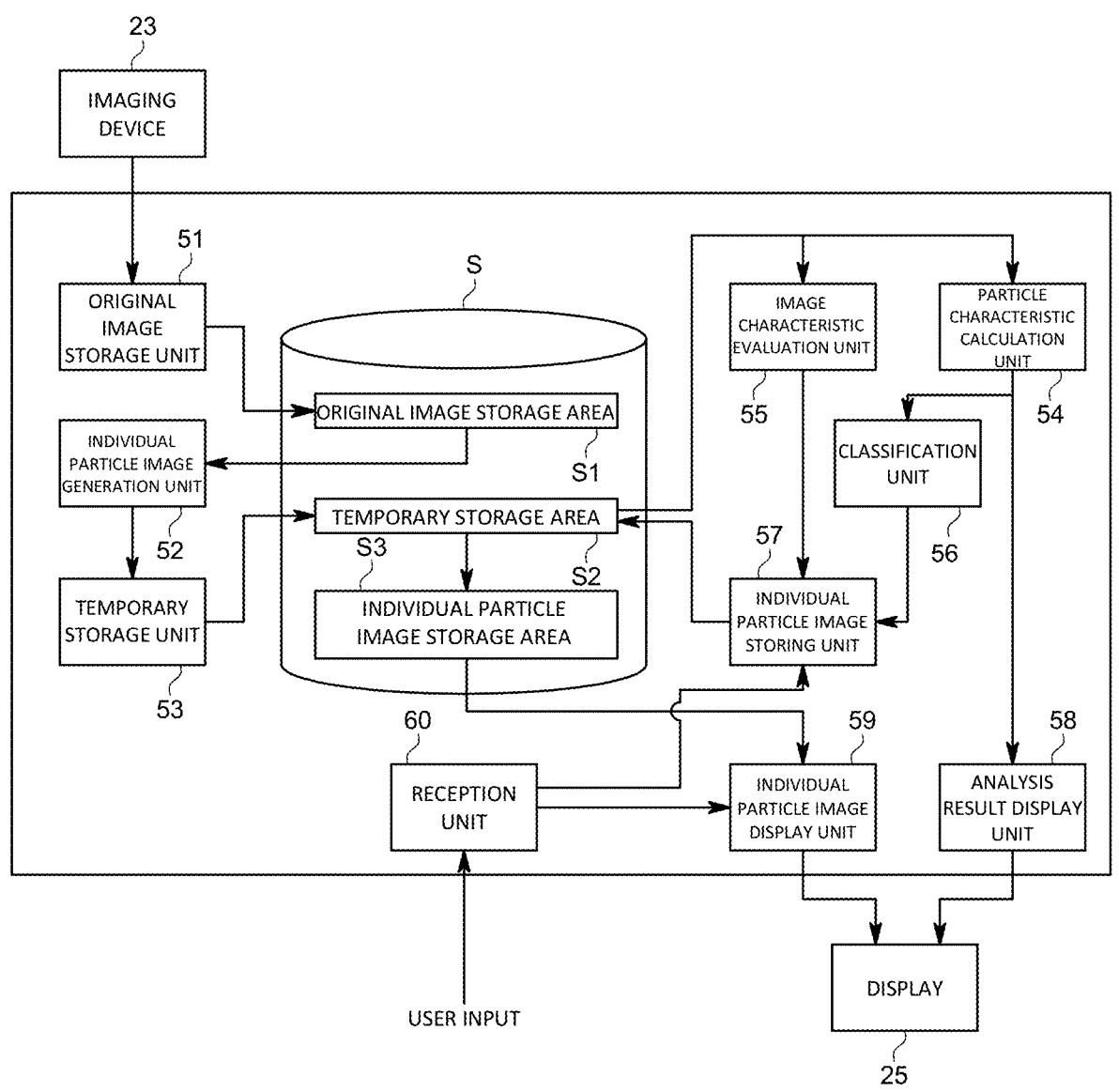
FIG. 2 is a functional block diagram illustrating a configuration of the particle image analysis apparatus according to the embodiment.

The analysis result is not limited to the two-dimensional scatter diagram as illustrated in FIG. 2, and may be a scatter diagram having three types of particle characteristics as variables. In addition, the number of types of particle characteristics used in the scatter diagram and the number of types of particle characteristics defining the class do not have to match. When at least one type of particle characteristic is common between the analysis result and the classes, a region can be set selectable by a user.

Furthermore, when it is desired to know the dispersion of one type of particle characteristic, the analysis result display unit may be configured to display a histogram related to the particle characteristic. In this case, if a plurality of regions are set for the respective class ranges on the histogram, it is possible to easily grasp the feature regarding the external appearance of the particles for each class.

The item evaluated by the image characteristic evaluation unit is not limited to the focus state of each individual particle image, and another image characteristic for determining the quality of each image may be evaluated. For example, parameters such as contrast and sharpness may be evaluated, and an individual particle images that are more preferable for the user to visually determine may be preferentially stored within the storage upper limit number. Alternatively, instead of evaluating on the basis of a single image characteristic, the individual particle images may be evaluated based on a plurality types of image characteristics to select the individual particle images to be stored. In this case, an evaluation function including a plurality of types of evaluation values may be created, and the individual particle images may be stored within the storage upper limit number in order from the best output value of the evaluation function. In addition, if it is difficult to express image characteristics as a function or numerical values, a preferable individual particle image may be learned by AI by machine learning or the like, and the preferable individual particle images may be selected within the storage upper limit number. Note that, regarding the setting for which image characteristic is to be evaluated, the setting may be changeable in accordance with user input to the reception unit. In addition, the image characteristics of the individual particle images may not be evaluated in the first place, and the individual particle images of the particles of each class may be randomly sampled within the storage upper limit number, or the individual particle images may be stored within the storage upper limit number in a first come, first served manner.

Regarding the storage upper limit number, the same storage upper limit number may be uniformly set for each class, or instead, the storage upper limit number may be settable to be different in at least some classes. For example, in a case where the user wants to focus on a certain class in terms of analysis, the storage upper limit number for the class may be set to be larger than those for other classes. Furthermore, it is not necessary to set the storage upper limit number for all the classes, and the storage upper limit number may be set at least a class that is considered to appear at a high frequency. In other words, the storage upper limit number may not be set for a class having a low appearance frequency or a class important for analysis, and all individual particle images may be stored without limitation for such classes. Note that the storage upper limit number does not have to be fixed in advance, and may be appropriately changeable according to user input to the reception unit.

In addition, various modifications of the embodiments, combinations of part of each embodiment, and the like may be made without departing from the gist of the present invention.

INDUSTRIAL APPLICABILITY

As described above, according to the present invention, it is possible to provide the particle image analysis apparatus capable of storing the individual particle images of the particles having a low appearance frequency and obtaining more information on the particle group while suppressing the data capacity required to store the individual particle images.

REFERENCE SIGNS LIST

200 particle image analysis system
1 cell
121 laser light source
3 lens
4 camera
100 particle image analysis apparatus
51 original image storage unit
52 individual particle image generation unit
53 temporary storage unit
54 particle characteristic calculation unit
55 image characteristic evaluation unit
56 classification unit
57 individual particle image storing unit
58 analysis result display unit
59 individual particle image display unit
60 reception unit
PI individual particle image
S storage
S1 original image storage area
S2 temporary storage area
S3 individual particle image storage area

The invention claimed is:

1. A particle image analysis apparatus is a particle analysis apparatus that analyzes a particle characteristic, based on an original image in which particles or a particle group is imaged, the particle image analysis apparatus comprising:
   an individual particle image generation unit that extracts individual particles from the original image and generates individual particle images;
   a particle characteristic calculation unit that calculates one or a plurality of types of particle characteristics for a particle in each of the individual particle images, based on the each of the individual particle images;
   a classification unit that classifies, with respect to a plurality of classes defined by some or all of the one or plurality of types of particle characteristics, the particles into the classes that correspond to the calculated one or plurality of particle characteristics;
   an image characteristic evaluation unit that evaluates an image characteristic of each of the individual particle images; and
   an individual particle image storing unit that stores in a storage the individual particle images of particles belonging to each of the plurality of classes, the individual particle images stored in the storage being less than or equal to a storage upper limit number set for the each of the plurality of classes,
   wherein when storing a new individual particle image would exceed the storage upper limit, the individual particle image storing unit is configured to preferentially store individual particle images belonging to each of the plurality of classes having better image characteristic values, in a number equal to the storage upper limit number, by comparing an image characteristic value of the new individual particle image with image characteristic values of already stored individual particle images, and when the image characteristic value of the new individual particle image is better than at least one of the image characteristic values of already stored individual particle images, storing the new individual particle image and deleting one of the already stored individual particle images having an image characteristic value that is worse than the image characteristic value of the new individual particle image.

2. The particle image analysis apparatus according to claim 1, wherein
   the image characteristic evaluation unit evaluates a focus state of a particle in each of the individual particle images, and
   the individual particle image storing unit preferentially stores in the storage unit individual particle images having a good focus state for each of the classes.

3. The particle image analysis apparatus according to claim 1, further comprising:
   an analysis result display unit that displays an analysis result representing a distribution of a particle characteristic of each of the particles;
   a region setting unit that sets a plurality of regions on the analysis result in accordance with the classes;
   a reception unit that receives, from a user, selection with respect to the regions on the analysis result; and
   an individual particle image display unit that reads out, from the storage unit, an individual particle image of particles belonging to a class corresponding to the region selected by the user and displays the read-out individual particle image.

4. The particle image analysis apparatus according to claim 1, wherein the storage upper limit number is settable uniformly or individually for each of the classes.

5. The particle image analysis apparatus according to claim 1, wherein
   the setting of the storage upper limit number is removed for some of the classes, and
   all of the individual particle images of the some of the classes are stored in the storage unit.

6. The particle image analysis apparatus according to claim 1, wherein an image characteristic to be evaluated by the image characteristic evaluation unit is settable.

7. The particle image analysis apparatus according to claim 1, further comprising a list display unit that reads out from the storage the individual particle images of the particles belonging to each class of the plurality of classes, and displays on a single screen a list of individual particle images that are read out in association with each of the classes.

8. The particle image analysis apparatus according to claim 1, wherein the particle characteristic is at least one of a particle size, an aspect ratio, a degree of circularity, a major axis diameter, a minor axis diameter, an envelope peripheral length, an actual peripheral length, or a degree of envelope.

9. A particle image analysis system comprising:
the particle image analysis apparatus according to claim 1;
a light source that irradiates particles or a particle group contained in a cell with light; and
an imaging unit that images an inside of the cell and outputs the original image.

10. The particle image analysis apparatus according to claim 3, wherein
the analysis result is a scatter diagram having two or more types of particle characteristics as variables,
each of the classes is defined by all particle characteristics used for the scatter diagram, and
the plurality of regions are set in a matrix on the scatter diagram.

11. The particle image analysis apparatus according to claim 3, wherein
the analysis result is a histogram having a single type of particle characteristic as a variable, and
the plurality of regions are set for a range of each of the classes on the histogram.

12. The particle image analysis apparatus according to claim 3, wherein the analysis result and the individual particle images are displayed on a single screen.

13. The particle image analysis apparatus according to claim 3, wherein
the individual particle image display unit displays, in a juxtaposed manner, a list of a plurality of individual particle images related to the particles belonging to the class corresponding to the region selected by the user,
the reception unit receives selection with respect to the individual particle images from the user, and
the individual particle image display unit displays an enlarged image of an individual particle image selected by the user.

14. A particle image analysis method is a particle analysis method that analyzes a particle characteristic, based on an original image in which particles or a particle group is imaged, the particle image analysis method comprising:
generating individual particle images by extracting individual particles from the original image;
calculating one or a plurality of types of particle characteristics for a particle in each of the individual particle images, based on the each of the individual particle images;
classifying, with respect to a plurality of classes defined by some or all of the one or plurality of types of particle characteristics, the particles into the classes that correspond to the calculated one or plurality of particle characteristics;
evaluating an image characteristic of each of the individual particle images; and storing in a storage the individual particle images of particles belonging to each of the plurality of classes, the individual particle images stored in the storage being less than or equal to a storage upper limit number set for the each of the plurality of classes,
wherein when storing a new individual particle image would exceed the storage upper limit, the step of storing preferentially stores individual particle images belonging to each of the plurality of classes having better image characteristic values, in a number equal to the storage upper limit number, by comparing an image characteristic value of the new individual particle image with image characteristic values of already stored individual particle images, and when the image characteristic value of the new individual particle image is better than at least one of the image characteristic values of already stored individual particle images, storing the new individual particle image and deleting one of the already stored individual particle images having an image characteristic value that is worse than the image characteristic value of the new individual particle image.

15. A non-transitory computer readable medium storing a program for particle image analysis apparatus that is used for a particle analysis apparatus to analyze a particle characteristic, based on an original image in which particles or a particle group is imaged, and the program causing a computer to execute functions, the functions comprising:
a function of an individual particle image generation unit that extracts individual particles from the original image and generates individual particle images;
a function of a particle characteristic calculation unit that calculates one or a plurality of types of particle characteristics for a particle in each of the individual particle images, based on the each of the individual particle images;
a function of a classification unit that classifies, with respect to a plurality of classes defined by some or all of the one or plurality of types of particle characteristics, the particles into the classes that correspond to the calculated one or plurality of particle characteristics;
a function of an image characteristic evaluation unit that evaluates an image characteristic of each of the individual particle images; and
a function of an individual particle image storing unit that stores in a storage the individual particle images of particles belonging to each of the plurality of classes, the individual particle images stored in the storage being less than or equal to a storage upper limit number set for the each of the plurality of classes,
wherein when storing a new individual particle image would exceed the storage upper limit, the function of the individual particle image storing unit preferentially stores individual particle images belonging to each of the plurality of classes having better image characteristic values, in a number equal to the storage upper limit number, by comparing an image characteristic value of the new individual particle image with image characteristic values of already stored individual particle images, and when the image characteristic value of the new individual particle image is better than at least one of the image characteristic values of already stored individual particle images, storing the new individual particle image and deleting one of the already stored individual particle images having an image characteristic value that is worse than the image characteristic value of the new individual particle image.

* * * * *